April 11, 1967 A. W. KELSON 3,313,266
FUSIBLE PELLET TUBE CONTROL
Filed Aug. 30, 1965
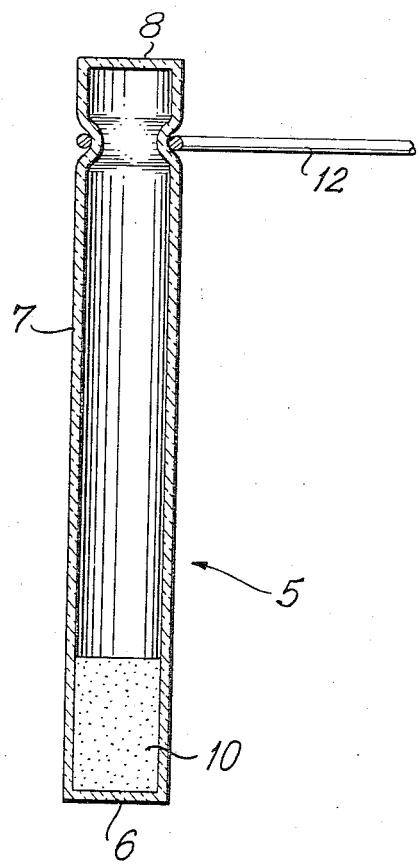
INVENTOR.
ARTHUR W. KELSON
BY
Blum, Moscovitz, Friedman, Blum & Kaplan
ATTORNEYS

United States Patent Office 3,313,266
Patented Apr. 11, 1967

3,313,266
FUSIBLE PELLET TUBE CONTROL
Arthur W. Kelson, New York, N.Y., assignor to Propper Manufacturing Company, Inc., Long Island City, N.Y., a corporation of New York
Filed Aug. 30, 1965, Ser. No. 483,436
8 Claims. (Cl. 116—114)

This invention relates to a new and novel device and method for checking and thereby controlling sterilizing temperatures and, more particularly, to a new and novel device and method for checking and thereby controlling sterilizing temperatures especially adapted for use in high temperature sterilization procedures.

Generally sterilization, especially of medical instruments, is carried out at temperatures of about 250° F. Instruments or other materials which are to be subjected to sterilizatoin, must be maintained for thirty minutes or longer at this temperature in order to sterilize these materials so as to completely destroy any harmful bacteria. In carrying out the sterilization procedure, it is necessary that the sterilization equipment operate at the proper temperature in order that the bacteria on the materials to be sterilized be completely destroyed. If the sterilizing apparatus is operating at below the desired temperature level, there is the danger that all of the bacteria on the surgical instruments or other materials will not be destroyed which in the case of surgical or other medinal instruments can prove to be disastrous. In order to confirm that the sterilization equipment is operating at the proper temperature level i.e. 250° F., it is necessary to check the operating temperature at various positions within the interior of the sterilization apparatus at various intervals.

By the operating temperature of the sterilizers, it is meant the temperature within the surgical packs containing the instruments that are to be sterilized that are placed in the sterilizer. The temperature within the pack may vary from that indicated by the thermometer placed on the sterilizers because of many factors, such as the lack of penetration of steam into the pack which consists of heavy muslin wrap etc. Therefore it is not unusual to have a sterilization cycle in which the thermometer or pressure gauges outside the autoclave indicate attainment of sterilization temperature in the free area of the autoclave, while at the same time specific points inside a pack have not yet attained a similar temperature. This delay inside the pack can range between 5 to 20 minutes for complete penetration of steam and it is even conceivable that complete penetration of steam in some badly made up surgical packs or heavily overloaded chambers, is never attained. Hence a proper means for checking the operating temperature within the surgical packs placed in a sterilizer is an important and necessary part of the sterilization procedure.

Various methods have been developed for checking the operating temperature within packs placed in a sterilization apparatus designed to operate at 250° F. One of these methods which is utilized to check the temperature within a 250° F. sterilizing apparatus is performed by placing a pellet containing a composition which is composed of materials which will fuse at a temperature of from about 246° F. to about 252° F. in admixture with an oil-soluble red dye in a surgical pack which is placed in a sterilization apparatus operating at 250° F. If the temperature in the pack is 250° F., the composition will fuse and the oil-soluble red dye which was not apparent before fusion will be soluble in the fused mass so as to impart a red color to the fused composition. The appearance of this color will indicate that the apparatus is operating at the proper temperatures and that the proper temperatures within the pack are being reached. Another means of checking the sterilization temperature consists of implanting live organisms on an occasional surgical pack, subjecting this pack to the sterilization procedure, and then checking for the "kill of bacteria" by culturing the pack after sterilization. This latter procedure is seldom used since it requires two weeks' of incubation to check the "kill of bacteria." Therefore, utilizing this procedure as a daily routine is almost impossible. Hence this procedure is only employed as an occasional check.

Utilizing a sterilizer that operates at 250° F. has one serious drawback n that it takes thirty minutes or longer to completely sterilize instruments or other materials, depending upon how they were wrapped when placed into the sterilizer. This is extremely disadvantageous especially when the materials to be sterilized are surgical instruments required for immediate use in an emergency operation. In order to avoid the disadvantages inherent in sterilization apparatus operating at 250° F., sterilization apparatus operating at temperatures of from about 268° F. to about 278° F. have been developed. These sterilizers perform the sterilization procedure almost immediately since it has been found that by placing surgical instruments into sterilizers operating at temperatures of from about 268° F. to about 278° F., complete sterilization of the instruments is accomplished in a period of from about three to seven minutes, depending upon how the instruments are wrapped when they are placed in the sterilizer. However, while these short-time sterilizers have been effective in reducing sterilization time, no adequate means of checking the operating temperature within the sterilizer has been developed. Therefore, there is always the danger in utilizing these sterilizers that the proper temperature levels of from about 268° F. to about 278° F. will not be reached causing some harmful bacteria residue to remain on the instrument. Due to the failure to develop an adequate checking device, many of these sterilization cycles operating at temperatures of from about 268° F. to about 278° F. have remained unchecked. While the pellet containing a fusible composition and an oil-soluble dye has been successfully utilized to check the operating temperatures of high temperature sterilization apparatus designed to operate at 250° F., it has not been successful for use in sterilizers designed to operate at temperatures of from about 268° F. to 278° F. since no material capable of fusing at a temperature of from about 268° F. to 278° F. and also capable of being a solvent for an oil-soluble dye so as to perfect a detectable color change at these temperatures has been found. In order to check the operating temperatures of sterilizers operating at temperatures of from about 268° F. to 278° F., pellets containing a material which fuses at this temperature (268° F. to 278° F.) but which does not undergo any color change have been utilized. However, due to the fact that these pellets do not undergo any color change it is hard to easily determine the difference between the fused and unfused material and thereby determine whether the proper operating temperature has been reached. Hence these pellets containing a fusible composition have not been successfully utilized in checking the operating temperatures of high-speed sterilizers.

Therefore it has long been desired to develop a suitable device for checking and thereby controlling the operating temperatures of sterilizers designed to operate at from about 268° F. to about 278° F.

Therefore, it is an object of this invention to provide a new and novel device for checking and thereby controlling the temperature of sterilizers operating at from about 268° F. to 278° F.

It is a further object of this invention to provide a new and novel method for checking and thereby controlling the temperature of sterilizers operating at from about 268° F. to about 278° F.

It is a further object of this invention to provide a new and novel device which will clearly indicate when a desired temperature within the range of from about 268° F. to about 278° F. will be reached so as to be utilized for checking operating temperatures of sterilizers operating within the range of from about 268° F. to 278° F.

Other objects of the present invention will become apparent upon reading the following specification and referring to the accompanying drawing, which forms a material part of this disclosure.

I have discovered that a device which is composed of a transparent tube containing a solid composition having from about 0.2% to 5% by weight of moisture, said composition comprising a solid neutral organic material capable of liberating an alkali at a temperature of from about 268° F. to about 278° F. and a chemical indicator which is active within the pH range of from about 8 to about 12, can be effectively utilized to check and thereby control temperatures of high-speed sterilizers due to the clear change of color that is affected in this solid composition once a temperature of from about 268° F. to about 278° F. is reached. Furthermore, by utilizing the device of this invention the change of color that is affected when a temperature of from about 268° F. to about 278° F. is reached is so apparent to the human eye, that there is no need to use any standard or comparison to determine if a color change has been effected. Hence by means of this invention a device is provided whereby the temperature of high-speed sterilizers can be easily and readily checked and thereby controlled. Therefore medical instruments can be quickly and easily sterilized in a matter of about three minutes so that they can be utilized in emergency operations without the danger of harmful bacteria remaining on the instruments.

In the accompanying drawing, there is shown a highly magnified view illustrating the structure of the device for checking and thereby controlling temperatures in high speed sterilizers according to one embodiment of the invention.

In the drawing, the device 5 comprises a tube 7 which is sealed at both of its ends 6 and 8. Within the sealed tube 7 there is placed prior to sealing, a composition 10 which will change color once a temperature of from about 268° F. to about 278° F. is reached. After the composition 10 has been placed in tube 7 and end 8 sealed, a string 12 may be attached to end 8. If desired, string 12 may be colored the color that composition 10 becomes when a temperature of from about 268° F. to 278° F. is reached. If this is the case string 12 will become an instant indicator of whether a high speed sterilization apparatus is operating at the proper temperature.

The device 5 may be inserted in any common manner into the high speed sterilizer. Generally it is preferred to insert the device 5 in exactly the same manner as the instruments to be sterilized are inserted. Hence the device 5 is usually inserted by wrapping it in several thicknesses of a towel or by laying device 5 between two folds of a towel. In this manner device 5 will be subjected to the same temperature conditions as are the instruments which are inserted to be sterilized. After a few minutes at this temperature, the device 5 is removed from the sterilizer and observed. If the color of the composition is at the predetermined color, it will be apparent that the operating conditions within the sterilizer i.e. the temperature, are right to perform high speed sterilization. If the color of the string is the same color as the color reached by composition 10 at temperatures of from about 268° F. to about 278° F., a quick and convenient means for determining the operating conditions within the high speed sterilizer will be provided. It is apparent that string 12 may be colored any color in accordance with this invention, however, for convenience it is preferred that string 12 be colored the same color which composition 10 becomes once the proper operating temperatures within the high speed sterilizer are reached.

In accordance with this invention composition 10 should contain any solid, neutral, organic material capable of releasing an alkali at temperatures of from about 268° F. to about 278° F. By neutral, I mean any solid composition which will not affect the color of the chemical indicator which is active within the pH range of from about 8 to about 12. Any solid, organic, neutral material or mixtures thereof capable of liberating an alkali at a temperature of from about 268° F. to about 278° F. may be utilized. Among the preferred compounds capable of liberating an alkali are the solid organic amine or amide compounds which liberate ammonia at temperatures of from about 268° F. to about 290° F. such as urea. In formulating the composition of this invention, it is preferred that the alkali liberating compound be present in an amount of from about 80% by weight to about 95% by weight, based on the weight of the composition. While lower amounts than 80% of the alkali liberating compound may be utilized, it has been found that best color change is effected when at least 80% by weight of the alkali liberating material is utilized.

Furthermore, in accordance with this invention, an indicator which is active within the pH range of from about 8 to about 12 should be present in the composition 10. Any conventional chemical indicator which is color sensitive or active within the pH range of from about 8 to about 12 can be utilized in accordance with this invention. Examples of many of the typical indicators which may be utilized in accordance with this invention include phenolphthalein, ortho cresolphthalein, phenol red, chlor phenol red, cresol red, brom-thymol blue, rosolic acid, methyl red, etc. It has been found that best results are achieved when the indicator is present in the composition 10 in amounts of from about 1% to about 5% by weight. If desired, amounts of greater than 5% by weight of the indicator may be present in the composition, however, it has been found that excess indicator may not provide as clear a color change as desired once the operating temperatures of the high speed sterilizer have been reached.

The composition 10 of this invention should contain from about 0.2% by weight to about 5% by weight of moisture. In this manner, the alkali that is released when the alkali liberating neutral organic compound or mixtures thereof is heated to a temperature of from about 268° F. to about 278° F. is activated so it will cause the formation of the indicated color by virtue of the reaction of the chemical indicator. The water provides a medium in which the chemical indicator and the alkali react to form the desired color. In order to achieve the best color results, it has been found that the composition of this invention should contain from about 0.2% to about 5% by weight of the composition of water. The water may be, if desired, added directly to the composition containing the alkali liberating material and the chemical indicator. On the other hand, the water may be contained within one of the materials utilized in forming the composition. This is true since many alkali liberating neutral organic materials such as urea contain in their commercial form about 0.2% to about 5% by weight of water. Thus the amount of water present in commercially available alkali liberating materials is sufficient to produce the desired results. Alternately if desired, solid, neutral materials which release water at elevated temperatures may be incorporated into the composition to supply the necessary water needed in the composition. Among the many materials which release water and which can be utilized in the composition of this invention are included invert sugar, cupric sulfate hydrate, levulose.

As the tube 5 any transparent material capable of withstanding temperatures greater than 280° F. may be utilized. Among the various materials which may be utilized to form the tube 5, there are included glass, polydiallyl phthlate silicone resin, Teflon, bisphenol epichlorohydrin resins such as those of the Epon series, etc. The tube 7 is sealed after the composition 10 has been placed therein. The composition 10 which is placed in tube 7 may be in the form of a finely ground powder or may be pelletized by any conventional pelletizing process.

In accordance with this invention, any solid neutral organic material capable of fusing at temperatures of from about 268° F. to about 278° F. may be incorporated into the composition of this invention. These fusible materials, it has been found, enhance the color of the composition once the high speed sterilization temperature has been reached. Furthermore, the incorporation of an organic material which melts at a temperature of from about 268° F. to 278° F. allows the composition of this invention quickly to reach the operating temperature of the sterilizer as soon as it is placed in the sterilizer. In accordance with this invention any solid neutral material which will fuse at a temperature of from about 268° F. to about 278° F. can be incorporated, if desired, into the composition of this invention to produce the additional enhanced results. These fusible materials may also be capable of yielding upon heating an alkali. If materials are utilized which fuse at the aforementioned high speed sterilizing temperatures and also have the property of yielding an alkali at temperatures greater or lower than 278° F., it has been found, that in some cases when these materials are admixed with the neutral materials which produce an alkali at temperatures of from about 268° F. to about 278° F., an eutectic material will be formed which will yield an alkali when a temperature of from about 268° F. to about 278° F. is reached. Typical materials which fuse at temperatures of from about 268° F. to 278° F. which can be utilized in accordance with this invention include biuret, phenyl urea, ethylene urea, etc. or mixtures thereof. In accordance with this invention, the fusible material can comprise a mixture of compounds, each of the compounds having melting points or fusing points greater or lower than from about 268° F. to about 278° F. wherein this mixture of compounds is a eutectic mixture having a fusing point at a temperature of from about 268° F. to about 278° F. If it is desired to incorporate the fusible material into the composition of this invention, it has been found that maximum beneficial results are obtained from the fusible material, when the fusible material is present in the composition in amounts of from about 4% to about 15% by weight, based on the weight of the composition. While higher or lower amounts of the fusible material than that designated may be utilized if it is desired to incorporate a fusible material into the composition of this invention, it has been found that best results are achieved from the fusible material when these amounts are utilized.

If it is desired to pelletize the composition of this invention various additives which will facilitate the binding and lubricating of the composition of this invention may be incorporated so that a pellet can be easily formed. These materials include stearates, invert sugar, levulose, Avicel, etc. It is apparent that any conventional binder or lubricant utilized for pelletizing powdered materials can be incorporated into the composition of this invention.

The invention will be further illustrated by the following specific examples, but it will be understood that the invention is not limited thereby.

EXAMPLE 1

This example illustrates the temperature-checking device of this invention.

The following components were mixed in the following proportions:

| Components: | Percent by weight |
| --- | --- |
| Urea (containing 2% by weight of $H_2O$) | 95 |
| Biuret | 1 |
| Phenolphthalein | 4 |

The above composition was mixed and ground together to form a fine powder. 100 mg. of the powder were placed in a cylindrical glass tube having a diameter of about 0.05 inch and a height of about 2 inches. After the composition was placed into the glass tube, the glass tube was sealed. After sealing the glass tube was laid between two folds of a towel. The towel was placed on a tray in a high speed sterilizer designed to operate at 270° F. After a few minutes the towel was removed from the sterilizer. The color of the pellet was pink as compared to the original color of white. This pink color indicated that the sterilizer was operating at a temperature of about at least 270° F.

EXAMPLE 2

This example illustrates the temperature-checking device of this invention.

The following components were mixed in the following proportions:

| Components: | Percent by weight |
| --- | --- |
| Urea (containing 2% by weight of moisture) | 92 |
| Phenyl urea | 2 |
| Phenolphthalein | 3 |
| Levulose sugar | 2 |
| Biuret | 1 |

The above composition was mixed and ground together to form a fine powder. 100 mg. of the powder were placed in a cylindrical glass tube having a diameter of about 0.05 inch and a height of about 2 inches. After the composition was placed into the glass tube, the glass tube was sealed. After sealing the glass tube was laid between two folds of a towel. The towel was placed on a tray in a high speed sterilizer designed to operate at 270° F. After a few minutes the towel was removed from the sterilizer. The color of the pellet was pink as compared to the original color of white. This pink color indicated that the sterilizer was operating at a temperature of about at least 270° F.

Having described my invention, what I claim is as follows:

1. A device for checking the temperature of high speed sterilizers comprising a sealed transparent tube containing a solid composition adapted to change color and fuse at temperatures of from about 268° F. to about 278° F., said composition comprising a solid neutral organic material capable of releasing an alkali and fusing at temperatures of from about 268° F. to about 278° F., a chemical indicator which will change color within the pH range of from about 8 to 12, said composition containing from about 0.2% by weight to about 5% by weight, based on the weight of the composition, of water.

2. The device of claim 1 wherein said tube contains a string attached at one end thereof, said string being the color of the indicator at the pH range of from about 8 to about 12.

3. A device for checking the temperature of high speed sterilizers comprising a sealed transparent tube containing a solid composition adapted to change color and fuse at temperatures of from about 268° F. to about 278° F., said composition comprising a solid neutral organic material capable of fusing and releasing ammonia at temperatures of from about 268° F. to about 278° F., a chemical indicator which will change color within the pH range of from about 8 to 12, said composition containing from about 0.2% by weight to about 5% by weight, based on the weight of the composition, of water.

4. The device of claim 3 wherein said tube contains a string attached at one end thereof, said string being the color of the indicator at the pH range of from about 8 to about 12.

5. The device of claim 3 wherein said solid organic material is urea.

6. A device for checking the temperature of high speed sterilizers comprising a sealed transparent tube containing a solid composition adapted to change color and fuse at temperatures of from about 268° F. to about 278° F., said composition comprising a solid neutral organic compound capable of releasing an alkali and fusing at temperatures of from about 268° F. to about 278° F., a chemical indicator which will change color within the pH range of from about 8 to 12, a solid neutral fusible organic material capable of fusing at a temperature of from about 268° F. to about 278° F., said composition containing from about 0.2% by weight to about 5% by weight, based on the weight of the composition of water.

7. The device of claim 6 wherein said tube contains a string attached at one end thereof, said string being the color of the indicator at the pH range of from about 8 to about 12.

8. A device for checking the temperature of high speed sterilizers comprising a sealed transparent tube containing a solid composition adapted to change color and fuse at temperatures of from about 268° F. to about 278° F., said composition comprising urea, a chemical indicator which will change color within the pH range of from about 8 to about 12, a solid organic fusible neutral material capable of fusing at a temperature of from about 268° F. to about 278° F., said composition containing from about 0.2% to about 5% by weight of water, based on the weight of said composition.

References Cited by the Examiner
UNITED STATES PATENTS

| | | | |
|---|---|---|---|
| 2,046,863 | 7/1936 | Allphin | 116—114.20 |
| 2,195,395 | 4/1940 | Chapman | 116—114.20 |
| 2,614,430 | 10/1952 | Ballard et al. | 116—114.20 |
| 2,799,167 | 7/1957 | Loconti | 116—114.20 |
| 2,847,067 | 10/1958 | Brewer | 116—114.20 |
| 2,889,799 | 6/1959 | Korpman | 116—114.20 |
| 3,002,385 | 10/1961 | Wahl et al. | 116—114.20 |
| 3,114,349 | 12/1963 | Schuman | 116—114.20 |

LOUIS J. CAPOZI, *Primary Examiner.*